US012612043B2

(12) United States Patent
Okunishi et al.

(10) Patent No.: US 12,612,043 B2
(45) Date of Patent: Apr. 28, 2026

(54) CONTROL DEVICE FOR AUTO LANE CHANGING BASED ON OBJECT DETECTION AROUND THE VEHICLE

(71) Applicant: HONDA MOTOR CO., LTD., Tokyo (JP)

(72) Inventors: Shinichi Okunishi, Saitama (JP); Tatsuya Konishi, Saitama (JP); Keita Akiho, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 18/113,718

(22) Filed: Feb. 24, 2023

(65) Prior Publication Data

US 2023/0322227 A1 Oct. 12, 2023

(30) Foreign Application Priority Data

Mar. 25, 2022 (JP) ................................. 2022-050619

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2554/20* (2020.02); *B60W 2554/80* (2020.02)

(58) Field of Classification Search
CPC ......... B60W 30/18163; B60W 60/001; B60W 2554/20; B60W 2554/80; B60W 2552/50; B60W 40/06; G01S 13/931
See application file for complete search history.

(56) References Cited

U.S. PATENT DOCUMENTS

2014/0320333 A1 10/2014 Sugiyama
2016/0046290 A1* 2/2016 Aharony ............... B60W 10/20
701/41
(Continued)

FOREIGN PATENT DOCUMENTS

CN 111179300 A 5/2020
CN 113291309 A 8/2021
(Continued)

OTHER PUBLICATIONS

Sep. 5, 2023, Translation of Japanese Office Action issued for related JP Application No. 2022-050619.
(Continued)

*Primary Examiner* — James J Lee
*Assistant Examiner* — Alexander George Matta
(74) *Attorney, Agent, or Firm* — Paratus Law Group, PLLC

(57) ABSTRACT

A control device that performs travel control of a vehicle, the control device includes a processor configured to acquire output information of a sensor configured to detect an object in the around of the vehicle based on a reflected wave from the object. The processor is configured to: acquire first detection point group data of the object in a first region in the around of the vehicle based on the output information of the sensor, and recognize a first specific object present in the around of the vehicle based on the first detection point group data; and recognize a second specific object present in the around of the vehicle based on the first detection point group data in a second region that is narrower than the first region in the around of the vehicle when recognizing the presence of the first specific object.

5 Claims, 9 Drawing Sheets

(56)              References Cited

U.S. PATENT DOCUMENTS

2017/0227966 A1 *   8/2017   Monzen ............. B62D 15/0255
2017/0267244 A1 *   9/2017   Kim ..................... B60W 10/06
2018/0074506 A1 *   3/2018   Branson ................... G06N 3/04
2018/0239352 A1 *   8/2018   Wang .................... B60W 50/14
2019/0023239 A1     1/2019   Fujita et al.
2019/0196466 A1 *   6/2019   Agarwal .............. G05D 1/0061
2021/0248391 A1     8/2021   Kizumi et al.

FOREIGN PATENT DOCUMENTS

JP          2010-052601 A     3/2010
JP          2014-199221 A    10/2014
WO    WO 2017/130643 A1    8/2017

OTHER PUBLICATIONS

Jan. 14, 2026, Translation of Chinese Office Action issued for related CN Application No. 202310181547.5.

* cited by examiner

100

| 120 | FIRST CONTROL UNIT |
| 130 | RECOGNITION UNIT |

RECOGNITION RESULT

150

| 140 | ACTION PLAN GENERATION UNIT |
| | MODE DETERMINATION UNIT |

TARGET
TRAJECTORY (84)

| 160 | SECOND CONTROL UNIT |
| 162 | ACQUISITION UNIT |
| 164 | SPEED CONTROL UNIT |
| 166 | STEERING CONTROL UNIT |

~170

TRAVEL CONTROL UNIT

FIG. 4

| DRIVING MODE | CONTROL STATE | TASK |
|---|---|---|
| FIRST DRIVING MODE | AUTOMATIC DRIVING | FRONT MONITORING: UNNECESSARY<br>STEERING GRIPPING: UNNECESSARY |
| SECOND DRIVING MODE | DRIVING ASSISTANCE | FRONT MONITORING: NECESSARY<br>STEERING GRIPPING: UNNECESSARY |
| THIRD DRIVING MODE | DRIVING ASSISTANCE | FRONT MONITORING: NECESSARY<br>STEERING GRIPPING: NECESSARY |
| FOURTH DRIVING MODE | DRIVING ASSISTANCE | FRONT MONITORING: NECESSARY<br>AT LEAST CERTAIN DEGREE OF<br>DRIVING OPERATION IS NECESSARY |
| FIFTH DRIVING MODE | MANUAL DRIVING | FRONT MONITORING: NECESSARY<br>DRIVING OPERATION IS REQUIRED<br>FOR BOTH STEERING AND<br>ACCELERATION AND DECELERATION |

TASK: LIGHT

TASK: HEAVY

FIG. 9

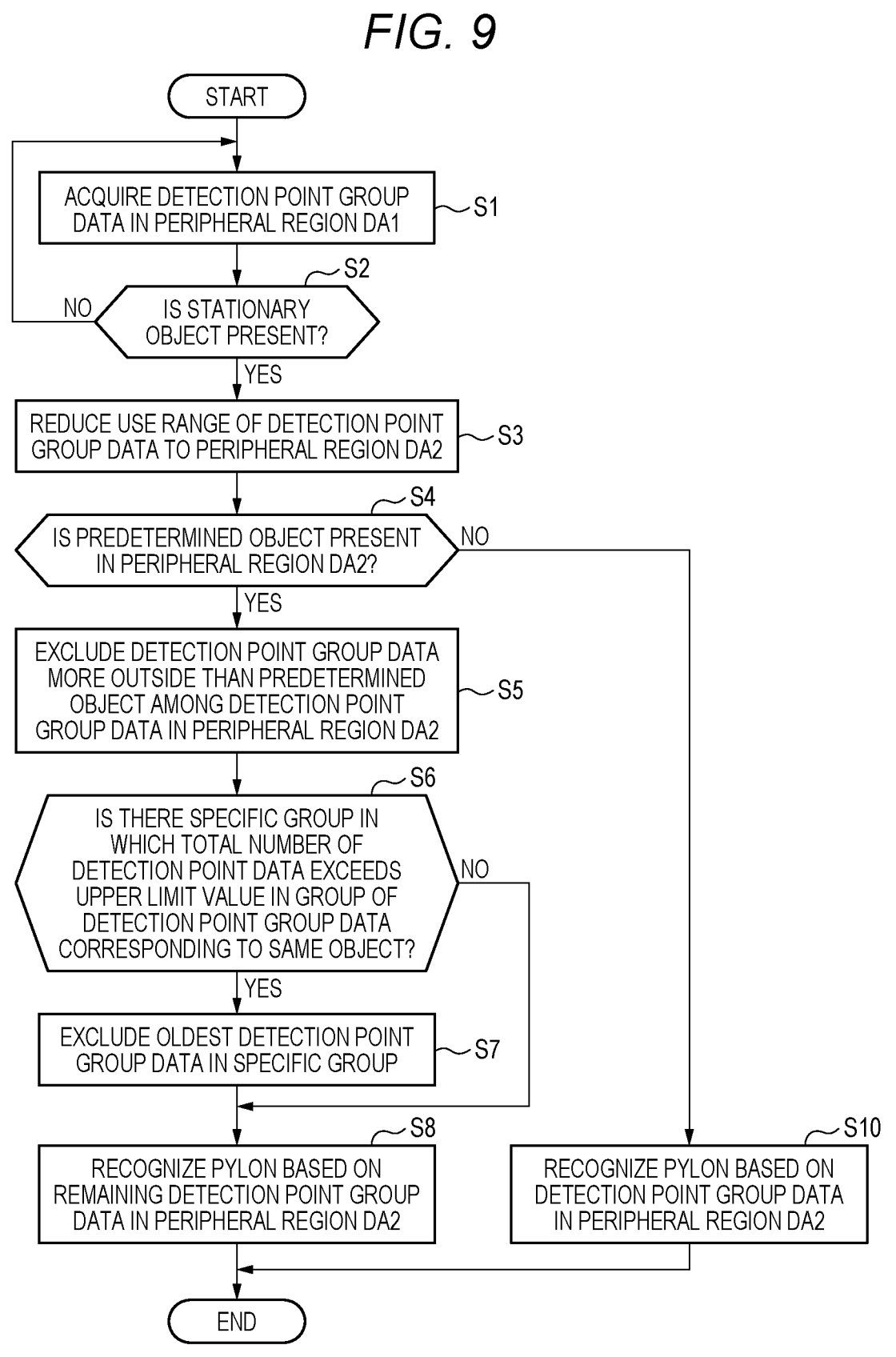

START

ACQUIRE DETECTION POINT GROUP
DATA IN PERIPHERAL REGION DA1 — S1

IS STATIONARY
OBJECT PRESENT? — S2
NO

YES

REDUCE USE RANGE OF DETECTION POINT
GROUP DATA TO PERIPHERAL REGION DA2 — S3

IS PREDETERMINED OBJECT PRESENT
IN PERIPHERAL REGION DA2? — S4
NO

YES

EXCLUDE DETECTION POINT GROUP DATA
MORE OUTSIDE THAN PREDETERMINED
OBJECT AMONG DETECTION POINT
GROUP DATA IN PERIPHERAL REGION DA2 — S5

IS THERE SPECIFIC GROUP IN
WHICH TOTAL NUMBER OF
DETECTION POINT DATA EXCEEDS
UPPER LIMIT VALUE IN GROUP OF
DETECTION POINT GROUP DATA
CORRESPONDING TO SAME OBJECT? — S6
NO

YES

EXCLUDE OLDEST DETECTION POINT
GROUP DATA IN SPECIFIC GROUP — S7

RECOGNIZE PYLON BASED ON
REMAINING DETECTION POINT GROUP
DATA IN PERIPHERAL REGION DA2 — S8

RECOGNIZE PYLON BASED ON
DETECTION POINT GROUP DATA
IN PERIPHERAL REGION DA2 — S10

END

CONTROL DEVICE FOR AUTO LANE CHANGING BASED ON OBJECT DETECTION AROUND THE VEHICLE

CROSS-REFERENCE TO RELATED APPLICATIONS

The present application claims the benefit of priority of Japanese Patent Application No. 2022-050619, filed on Mar. 25, 2022, the content of which is incorporated herein by reference.

TECHNICAL FIELD

The present disclosure relates to a control device.

BACKGROUND ART

In recent years, introduction of automatic driving and driving assistance of vehicles is rapidly progressing. As a technique for the automatic driving and the driving assistance of the vehicles, a technique such as auto lane changing (ALC) has been developed in which the vehicle changes lanes even when a driver does not perform an operation such as steering.

JP-A-2014-199221 discloses a radar device that detects an object in a scan range, the radar device includes: a detection unit that detects the object in the scan range based on a reflected wave with respect to a transmission wave and outputs a detection result of the object; and an adjustment unit that narrows the scan range so as not to detect an object other than a detection target when the detection result includes the object other than the detection target detected in the scan range within a predetermined time. The adjustment unit determines that an object whose speed is less than a first value is the object other than the detection target.

It is important to recognize a section in which traveling is restricted on a road (in the present specification, the section is defined as a travel-restricted section), such as a section in which lane regulation is performed due to construction work, an accident, or the like in order to improve safety when travel control of the vehicle is performed. In a situation in which the vehicle passes through or is approaching the travel-restricted section, a large number of objects such as a pylon may be present around the vehicle. Therefore, when such an object is detected in a wide range, a probability of occurrence of erroneous detection increases, and recognition accuracy of the travel-restricted section may be affected.

SUMMARY

An object of the present disclosure is to improve safety. Further, the present disclosure contributes to development of a sustainable transportation system by further improving safety of traffic.

According to an aspect of the present disclosure, there is provided a control device that performs travel control of a vehicle, the control device including a processor configured to acquire output information of a sensor configured to detect an object in the around of the vehicle based on a reflected wave from the object, where the processor is configured to: acquire first detection point group data of the object in a first region in the around of the vehicle based on the output information of the sensor, and recognize a first specific object present in the around of the vehicle based on the first detection point group data; and recognize a second specific object present in the around of the vehicle based on the first detection point group data in a second region that is narrower than the first region in the around of the vehicle when recognizing the presence of the first specific object.

According to the present disclosure, safety of the vehicle can be improved.

BRIEF DESCRIPTION OF THE DRAWINGS

FIG. 4 is a diagram illustrating specific examples of a driving mode.

FIG. 9 is a flowchart illustrating an operation of the control device 100.

DESCRIPTION OF EMBODIMENTS

Figure 1:
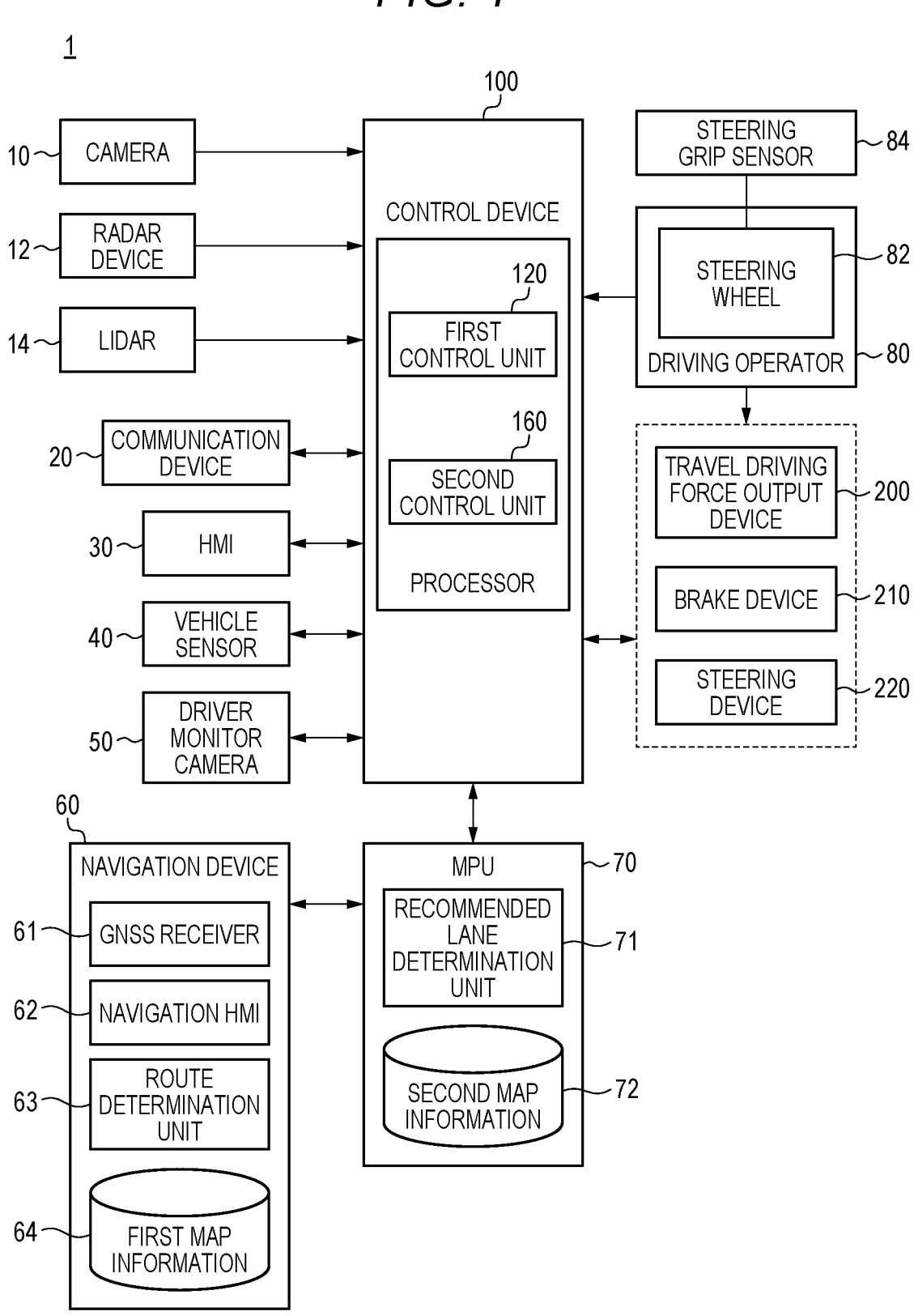
FIG. 1 is a block diagram illustrating an overall configuration of a vehicle system 1 on which a control device 100 is mounted.

Hereinafter, a vehicle system 1 including a control device 100 according to an embodiment of the present disclosure will be described with reference to the drawings. The drawings are viewed in directions of reference numerals. In the present specification, in order to simplify and clarify the description, front, rear, left, and right directions are described in accordance with directions viewed from a driver of a vehicle M illustrated in FIG. 2. In the drawings, a front side of the vehicle M is represented by Fr, a rear side thereof is represented by Rr, a left side thereof is represented by L. and a right side thereof is represented by R.

<Overall Configuration of Vehicle System 1>

Figure 2:
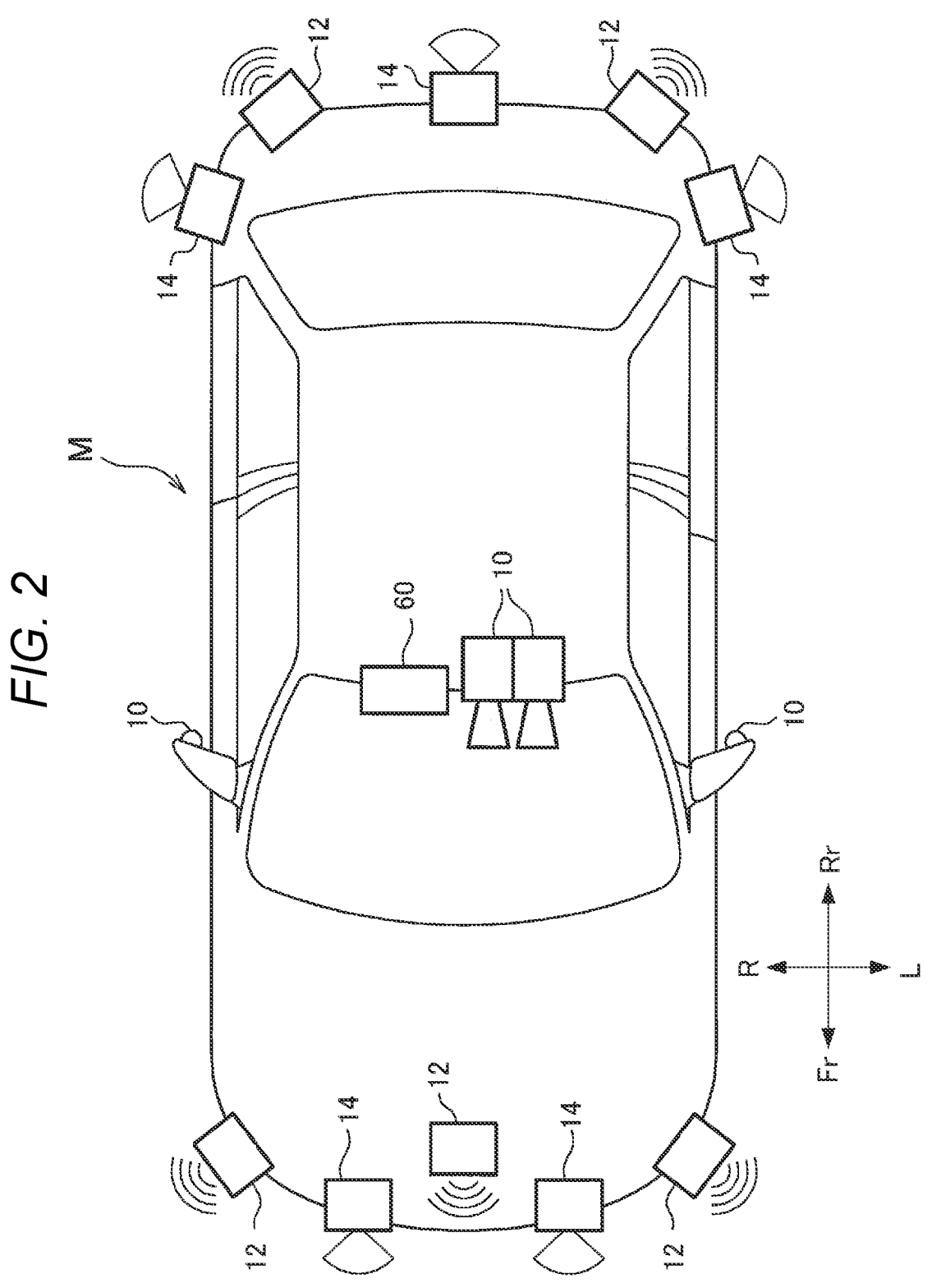
FIG. 2 is a schematic view illustrating an example of an external configuration of a vehicle M included in the vehicle system 1.

FIG. 1 is a block diagram illustrating an overall configuration of the vehicle system 1 on which the control device 100 is mounted. FIG. 2 is a schematic diagram illustrating an external configuration example of the vehicle M included in the vehicle system 1. The vehicle M is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates by using electric power generated by a generator connected to the internal combustion engine or electric power discharged from a secondary battery or a fuel cell. FIG. 2 illustrates the example in which the vehicle M is a four-wheeled vehicle.

The vehicle system 1 includes, for example, cameras 10, radar devices 12, light detection and ranging (LIDAR) 14, a communication device 20, a human machine interface (HMI) 30, a vehicle sensor 40, a driver monitor camera 50, a navigation device 60, a map positioning unit (MPU) 70, a driving operator 80, the control device 100, a travel driving force output device 200, a brake device 210, and a steering device 220. These apparatuses and devices are connected to one another by a multiplex communication line such as a controller area network (CAN) communication line, a serial communication line, a wireless communication network, or the like.

The camera 10 is, for example, a digital camera using an imaging element such as charge coupled device (CCD) or a complementary metal oxide semiconductor (CMOS). The camera 10 is attached to an optional place of the vehicle M. For example, as illustrated in FIG. 2, the cameras 10 are provided in the vicinity of a rearview mirror (not illustrated) in a vehicle interior of the vehicle M, and in a front portion of a right door and a front portion of a left door in a vehicle exterior of the vehicle M. Image information (output information of the cameras 10) on a front side, a right rear side, and a left rear side in a traveling direction of the vehicle M captured by the camera 10 is transmitted to the control device 100.

The radar device 12 emits radio waves such as millimeter waves to the around of the vehicle M, detects radio waves (reflected waves) reflected by the object, and outputs information (hereinafter, also referred to as detection point data) on a position (hereinafter, also referred to as a detection point) where a part of the object specified by the reflected waves is present. As the radio wave, a laser, a microwave, a millimeter wave, an ultrasonic wave, or the like can be appropriately used. The radar device 12 is attached to an optional place of the vehicle M. For example, as illustrated in FIG. 2, five radar devices 12 are provided, three of them are provided on the front side, and two of them are provided on the rear side. Output information of the radar devices 12 is transmitted to the control device 100.

The LIDAR 14 emits light (or an electromagnetic wave having a wavelength close to that of the light) to the around of the vehicle M and measures scattered light. The LIDAR 14 detects the presence or absence of the object and a distance to the object based on a time from the light emission to light reception. The emitted light is, for example, pulsed laser light. The LIDAR 14 is attached to an optional place of the vehicle M. For example, as illustrated in FIG. 2, five LIDAR 14 are provided, two of them are provided on the front side, and three of them are provided on the rear side. Output information of the LIDAR 14 is transmitted to the control device 100.

The communication device 20 communicates with another vehicle present in the around of the vehicle M by using, for example, a cellular network, a Wi-Fi (registered trademark) network, Bluetooth (registered trademark), and dedicated short range communication (DSRC), or communicates with various server devices via a wireless base station.

The HMI 30 presents various types of information to an occupant of the vehicle M and receives an input operation performed by the occupant. The HMI 30 includes various display devices, speakers, buzzers, touch panels, switches, keys, and the like.

The vehicle sensor 40 includes a vehicle speed sensor that detects a speed of the vehicle M, an acceleration sensor that detects an acceleration, a yaw rate sensor that detects an angular velocity around a vertical axis, a direction sensor that detects a direction of the vehicle M, and the like.

The driver monitor camera 50 is, for example, a digital camera using an imaging element such as a CCD image sensor or a CMOS image sensor. The driver monitor camera 50 is attached to an optional place of the vehicle M at a position and in a direction in which an image of a head of an occupant (hereinafter, referred to as a driver) seated in a driver seat of the vehicle M can be captured from a front (in a direction in which an image of a face is captured).

The navigation device 60 includes, for example, a global navigation satellite system receiver 61, a navigation HMI 62, and a route determination unit 63. The navigation device 60 stores first map information 64 in a storage device such as a hard disk drive (HDD) or a flash memory.

The GNSS receiver 61 specifies a position of the vehicle M based on a signal received from a GNSS satellite. The position of the vehicle M may be specified or complemented by an inertial navigation system (INS) using an output of the vehicle sensor 40.

The navigation HMI 62 includes display devices, speakers, touch panels, keys, and the like. The navigation HMI 62 may be partially or entirely shared with the HMI 30 described above.

For example, the route determination unit 63 determines, with reference to the first map information 64, a route (hereinafter, referred to as on-map route) from the position of the vehicle M specified by the GNSS receiver 61 (or an input optional position) to a destination input by the occupant by using the navigation HMI 62. The first map information 64 is, for example, information in which a road shape is represented by a link indicating a road and nodes connected by the link. The first map information 64 may include a curvature of a road, point of interest (POI) information, and the like. The on-map route is output to the MPU 70.

The navigation device 60 may perform, based on the on-map route, route guidance using the navigation HMI 62. The navigation device 60 may transmit a current position and the destination to a navigation server via the communication device 20 and acquire a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided from the navigation device 60 into a plurality of blocks (for example, divides the on-map route every 100 [m] in the traveling direction of the vehicle), and determines a recommended lane for each block with reference to the second map information 72. For example, the recommended lane determination unit 71 determines which lane from a left the vehicle travels in. When there is a branching place on the on-map route, the recommended lane determination unit 71 determines the recommended lane such that the vehicle M can travel on a reasonable route for traveling to a branch destination.

The second map information 72 is map information having accuracy higher than that of the first map information 64. The second map information 72 includes information on a center of a lane, information on boundaries of the lane, or the like. The second map information 72 may further include road information, traffic regulation information, address information, facility information, telephone number information, and the like. The second map information 72 may be updated as needed by the communication device 20 communicating with another device.

The driving operator 80 includes, for example, an accelerator pedal, a brake pedal, a shift lever, a blinker, and other operators in addition to a steering wheel 82. A sensor that detects an operation amount or presence or absence of an operation is attached to the driving operator 80, and a detection result thereof is output to the control device 100 or a part or all of the travel driving force output device 200, the brake device 210, and the steering device 220.

The steering wheel 82 does not necessarily have to be annular, and may be in a form of an irregularly shaped steering member, a joystick, a button, or the like. A steering grip sensor 84 is attached to the steering wheel 82. The steering grip sensor 84 is implemented by an electrostatic capacitance sensor or the like, and outputs a signal capable of detecting whether the driver grips the steering wheel 82 to the control device 100.

The control device 100 includes at least a processor such as a central processing unit (CPU) and a storage medium necessary for an operation of the processor. The processor functions as a first control unit 120 and a second control unit 160 by executing a program stored in the storage medium. The control device 100 is not limited to one that performs processing by a single processor, and may be one that performs processing by a plurality of processors in a shared manner.

<Configurations of First Control Unit 120 and Second Control Unit 160>

Figure 3:
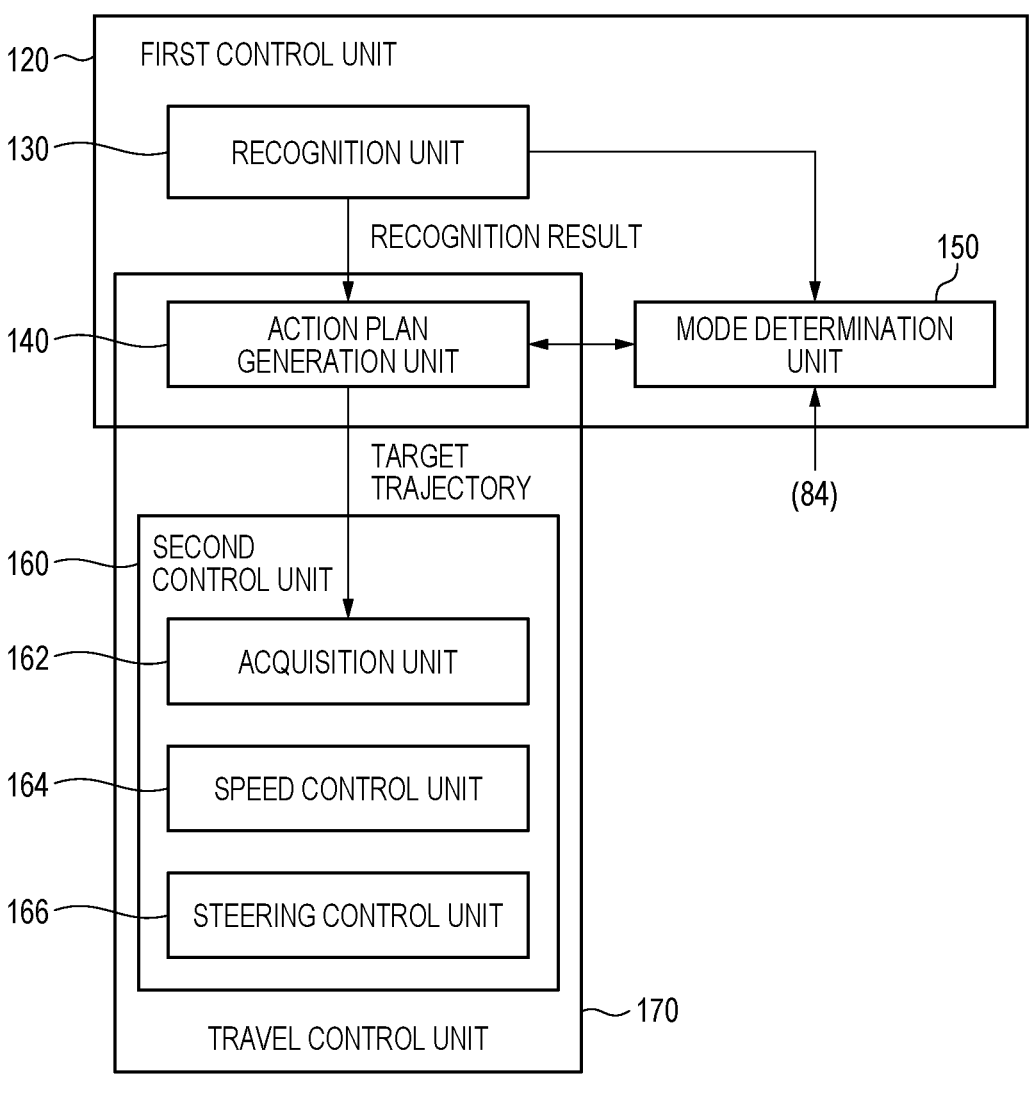
FIG. 3 is a diagram illustrating an example of configurations of a first control unit 120 and a second control unit 160.

FIG. 3 is a diagram illustrating an example of configurations of the first control unit 120 and the second control unit 160. The first control unit 120 includes, for example, a recognition unit 130, an action plan generation unit 140, and a mode determination unit 150. The first control unit 120 implements, for example, a function by artificial intelligence (AI) and a function by a model given in advance in parallel.

For example, a function of "recognizing an intersection" may be implemented by executing recognition of the intersection based on deep learning or the like and recognition based on a condition (including a signal, a road sign, or the like that can be subjected to pattern matching) given in advance in parallel, scoring both of them, and comprehensively evaluating them. Accordingly, reliability of automatic driving is ensured.

For example, the recognition unit 130 recognizes a traveling environment in which the vehicle M is traveling. For example, the recognition unit 130 recognizes a travel lane of the vehicle M by comparing a pattern of a road partition line (for example, an arrangement of solid lines and broken lines) obtained from the second map information 72 with a pattern of a road partition line in the around of the vehicle M recognized from an image captured by the camera 10. The recognition unit 130 may recognize the travel lane by recognizing traveling boundaries (road boundaries) including the road partition lines, road shoulders, curbstones, a median strip, guardrails, or the like, without being limited to the road partition lines. In the recognition, the position of the vehicle M acquired from the navigation device 60 or a processing result obtained by the INS may be added. Further, the recognition unit 130 recognizes a temporary stop line, an obstacle, a red light, a toll gate, and other road events.

When recognizing the travel lane, the recognition unit 130 recognizes the position and a posture of the vehicle M with respect to the travel lane. For example, the recognition unit 130 may recognize a deviation of a reference point of the vehicle M from a center of the lane and an angle formed between a traveling direction of the vehicle M and a line connecting a center of the lane as a relative position and a posture of the vehicle M with respect to the travel lane. Alternatively, the recognition unit 130 may recognize a position of the reference point of the vehicle M with respect to any side end portion (a road partition line or a road boundary) of the travel lane as the relative position of the vehicle M with respect to the travel lane.

The recognition unit 130 recognizes a peripheral environment of the vehicle M based on output information of a part or all of the cameras 10, the radar devices 12, and the LIDAR 14. For example, the recognition unit 130 recognizes a position of an object in the around of the vehicle M, a type of the object (whether the object is a moving object or a stationary object), and the like. The position of the object is recognized as, for example, a position on absolute coordinates (an XY plane indicated by a Y axis (a Y axis Ay in FIG. 6) that passes through a representative point (a center of gravity, a center of a driving axis, or the like) of the vehicle M and is parallel to a left-right direction and an X axis (an X axis Ax in FIG. 6) that passes through the representative point of the vehicle M and is parallel to a front-rear direction) having the representative point of the vehicle M as an origin, and is used for various types of control.

Examples of the object in the around of the vehicle M include a moving object (another vehicle traveling around the vehicle M) and a stationary object (an object forming a boundary of a road such as a planting, a wall, or a median strip, or an installation object (a cone, a guardrail, a signboard, a temporary traffic light, or the like)) specific to construction work or an accident. The installation object includes a specific object (specifically, a pylon) that can be discretely arranged on the road.

The recognition unit 130 performs processing of recognizing that the peripheral environment of the vehicle M is a travel-restricted section based on the output information of a part or all of the cameras 10, the radar devices 12, and the LIDAR 14. The phrase "the peripheral environment of the vehicle M is a travel-restricted section" refers to either a situation in which the vehicle M is traveling in the travel-restricted section or a situation in which the travel-restricted section is present ahead of the vehicle M by a predetermined distance. A phrase "the peripheral environment of the vehicle M is not a travel-restricted section" refers to a situation in which the vehicle M is not traveling in the travel-restricted section and the travel-restricted section is not present ahead of the vehicle M. The recognition unit 130 performs processing of collecting, as detection point group data, a set of detection point data having substantially the same distance from the vehicle M based on the output information of the radar devices 12, and acquiring the detection point group data.

The action plan generation unit 140 generates a target trajectory along which the vehicle M travels in the future automatically (not depending on an operation of the driver) such that the vehicle M travels in a recommended lane determined by the recommended lane determination unit 71 in principle and the recommended lane can cope with a surrounding situation of the vehicle M. The target trajectory includes, for example, a speed element. For example, the target trajectory is represented by sequentially arranging points (trajectory points) to be reached by the vehicle M. The trajectory point is a point to be reached by the vehicle M for each predetermined travel distance (for example, about several[m]) at a road distance, and separately, a target speed and a target acceleration for each predetermined sampling time (for example, about 0.X[sec]) are generated as a part of the target trajectory. The trajectory point may be a position to be reached by the vehicle M at a sampling time point for each predetermined sampling time. In this case, information on the target speed and the target acceleration is represented by an interval between the trajectory points.

When generating the target trajectory, the action plan generation unit 140 may set an event of the automatic driving. Examples of the event of the automatic driving include a constant speed traveling event, a low speed following traveling event, a lane change event, a branching event, a merging event, and a takeover event. The action plan generation unit 140 generates the target trajectory in accordance with an activated event.

The mode determination unit 150 determines a driving mode of the vehicle M be any one of a plurality of driving modes having different tasks imposed on the driver. Further, when a task of the determined driving mode (hereinafter, referred to as current driving mode) is not implemented by the driver, the mode determination unit 150 changes the driving mode of the vehicle M to a driving mode having a heavier task. The mode determination unit 150 is an example of a control state setting unit that selects an automation mode of control of at least one of the travel speed and steering of the vehicle M from the plurality of driving modes and set the automation mode.

<Specific Example of Driving Mode>

FIG. 4 is a diagram illustrating a specific example of the driving mode. The driving mode of the vehicle M includes, for example, five modes from a first driving mode to a fifth driving mode. A control state, that is, a degree of automation of driving control of the vehicle M is the highest in the first driving mode, then decreases in an order of the second driving mode, the third driving mode, and the fourth driving mode, and is the lowest in the fifth driving mode. On the contrary, a task imposed on the driver is the lightest in the first driving mode, then becomes heavy in the order of the second driving mode, the third driving mode, and the fourth driving mode, and is the heaviest in the fifth driving mode. Since the driving mode is in the control state which is not the automatic driving in the driving modes other than the first driving mode, the control device 100 is in charge of ending control of the automatic driving and shifting to driving assistance or manual driving. Hereinafter, contents of the respective driving modes will be exemplified.

In the first driving mode, an automatic driving state is established, and neither front monitoring nor gripping of the steering wheel 82 is imposed on the driver. However, even in the first driving mode, the driver is required to be in a posture capable of shifting to the manual driving in response to a request from the control device 100. Here, the term "automatic driving" means that both steering and acceleration and deceleration are controlled without depending on an operation of the driver. The front means a space in the traveling direction of the vehicle M visually recognized via a front windshield. The first driving mode is, for example, a driving mode that can be executed when a condition is satisfied that the vehicle M is traveling at a predetermined speed or less (for example, about 60 [km/h]) on an automobile dedicated road such as an expressway and a preceding vehicle to be followed is present.

In the second driving mode, a driving assistance state is established, and a task of monitoring the front of the vehicle M (hereinafter, referred to as front monitoring) is imposed on the driver, but a task of gripping the steering wheel 82 is not imposed on the driver. In the third driving mode, the driving assistance state is established, and the task of front monitoring and the task of gripping the steering wheel 82 are imposed on the driver. The fourth driving mode is a driving mode in which a certain degree of driving operation by the driver is necessary for at least one of the steering and the acceleration and deceleration of the vehicle M. For example, in the fourth driving mode, driving assistance such as adaptive cruise control (ACC) and lane keeping assist system (LKAS) is performed. The fifth driving mode is a manual driving state in which the driving operation by the driver is required for both steering and acceleration and deceleration. In both the fourth driving mode and the fifth driving mode, the task of monitoring the front of the vehicle M is naturally imposed on the driver.

Returning to FIG. 3, the second control unit 160 performs control such that the vehicle M passes through the target trajectory generated by the action plan generation unit 140 at a scheduled time point. The second control unit 160 includes, for example, an acquisition unit 162, a speed control unit 164, and a steering control unit 166.

The acquisition unit 162 acquires information on the target trajectory (trajectory points) generated by the action plan generation unit 140, and stores the acquired information in a memory (not illustrated). The speed control unit 164 controls the travel driving force output device 200 (see FIG. 1) or the brake device 210 (see FIG. 1) based on the speed element accompanying the target trajectory stored in the memory. The steering control unit 166 controls the steering device 220 (see FIG. 1) in accordance with a degree of curvature of the target trajectory stored in the memory. The processing of the speed control unit 164 and the steering control unit 166 is implemented by, for example, a combination of feedforward control and feedback control.

In the control device 100, a combination of the action plan generation unit 140 and the second control unit 160 constitutes a travel control unit 170. The travel control unit 170 executes control of the auto lane change in the vehicle M based on a recognition result of the traveling environment, the peripheral environment, or the like of the vehicle M recognized by the recognition unit 130. In addition, the travel control unit 170 detects an intention of the driver to change the lane based on an operation of the driving operator 80 (for example, a blinker lever) performed by the driver.

The travel control unit 170 selects one lane change mode from a plurality of lane change modes having different degrees of involvement by the driver of the vehicle M, and performs travel control (also referred to as lane change control) according to the selected lane change mode. The plurality of lane change modes having different degrees of involvement by the driver of the vehicle M can be referred to as a plurality of lane change modes having different degrees of automation. The smaller the degree of involvement by the driver is, the higher the degree of automation is, and the larger the degree of involvement by the driver is, the lower the degree of automation is.

For example, the plurality of lane change modes may include the following three modes of the auto lane change. The first auto lane change is an intended automatic lane change (ALC-category C) in which the driver of the vehicle M intends to change lanes by himself or herself and the driver of the vehicle M instructs the start of the lane change. In the intended auto lane change, the driver of the vehicle M determines whether to change the lane in consideration of a traveling situation of another vehicle, a route to a destination, and the like. When the driver of the vehicle M determines to change the lane, the driver instructs the start of the lane change to the vehicle M by operating the driving operator 80. Based on the instruction, the travel control unit 170 starts the auto lane change at an executable timing in consideration of a surrounding travel state.

The second auto lane change is a proposed auto lane change (ALC-category D) in which the travel control unit 170 proposes the lane change and the driver of the vehicle M approves the lane change. In the proposed auto lane change, the travel control unit 170 determines whether to change the lane based on a travel state of another vehicle, the route to the destination, and the like. When determining to change the lane, the travel control unit 170 proposes the lane change to the driver. When approving the proposal of the lane change, the driver of the vehicle M gives an instruction to start the lane change to the vehicle M by operating an approval switch. The approval switch may be a switch dedicated to approval, or may be an operator (for example, the driving operator 80) that also serves as another function. Based on the instruction, the travel control unit 170 starts the auto lane change at an executable timing in consideration of the surrounding travel state. Therefore, when the driver does not approve the proposal of the lane change, that is, when the driver does not operate the driving operator 80, the auto lane change is not implemented.

The third auto lane change is a determined auto lane change (ALC-category E) in which the travel control unit 170 determines the lane change and the travel control unit 170 determines to start the lane change. In the determined auto lane change, the travel control unit 170 determines whether to change the lane based on the travel state of another vehicle, the route to the destination, and the like. When the travel control unit 170 determines to change the lane, the travel control unit 170 starts the auto lane change at an executable timing in consideration of the surrounding travel state. In the case of the determined auto lane change, the driver of the vehicle M is not involved in the lane change.

The control device 100 executes the auto lane change according to the driving mode. For example, the control device 100 may execute the determined auto lane change in the first driving mode. The control device 100 may execute the proposed auto lane change in the second driving mode, the third driving mode, and the fourth driving mode. The control device 100 may execute the intended auto lane change in the third driving mode and the fourth driving mode. The control device 100 does not execute any auto lane change in the fifth driving mode.

Returning to FIG. 1, the travel driving force output device 200 outputs a travel driving force (torque) for the vehicle to travel to driving wheels. The travel driving force output device 200 includes, for example, a combination of an internal combustion engine, an electric motor, a transmission, and the like, and an electronic control unit (ECU) that controls these configuration components. The ECU controls the above-described configuration components according to information received from the second control unit 160 or information received from the driving operator 80.

The brake device 210 includes, for example, a brake caliper, a cylinder that transfers hydraulic pressure to the brake caliper, an electric motor that generates the hydraulic pressure in the cylinder, and a brake ECU. The brake ECU controls the electric motor according to the information received from the second control unit 160 or the information received from the driving operator 80 such that a brake torque according to a braking operation is output to each wheel.

The steering device 220 includes, for example, a steering ECU and an electric motor. For example, the electric motor changes a direction of steering wheels by applying a force to a rack and pinion mechanism. The steering ECU drives the electric motor and changes the direction of the steering wheels according to the information received from the second control unit 160 or the information received from the driving operator 80.

<Detectable Range of Object>

Figure 5:
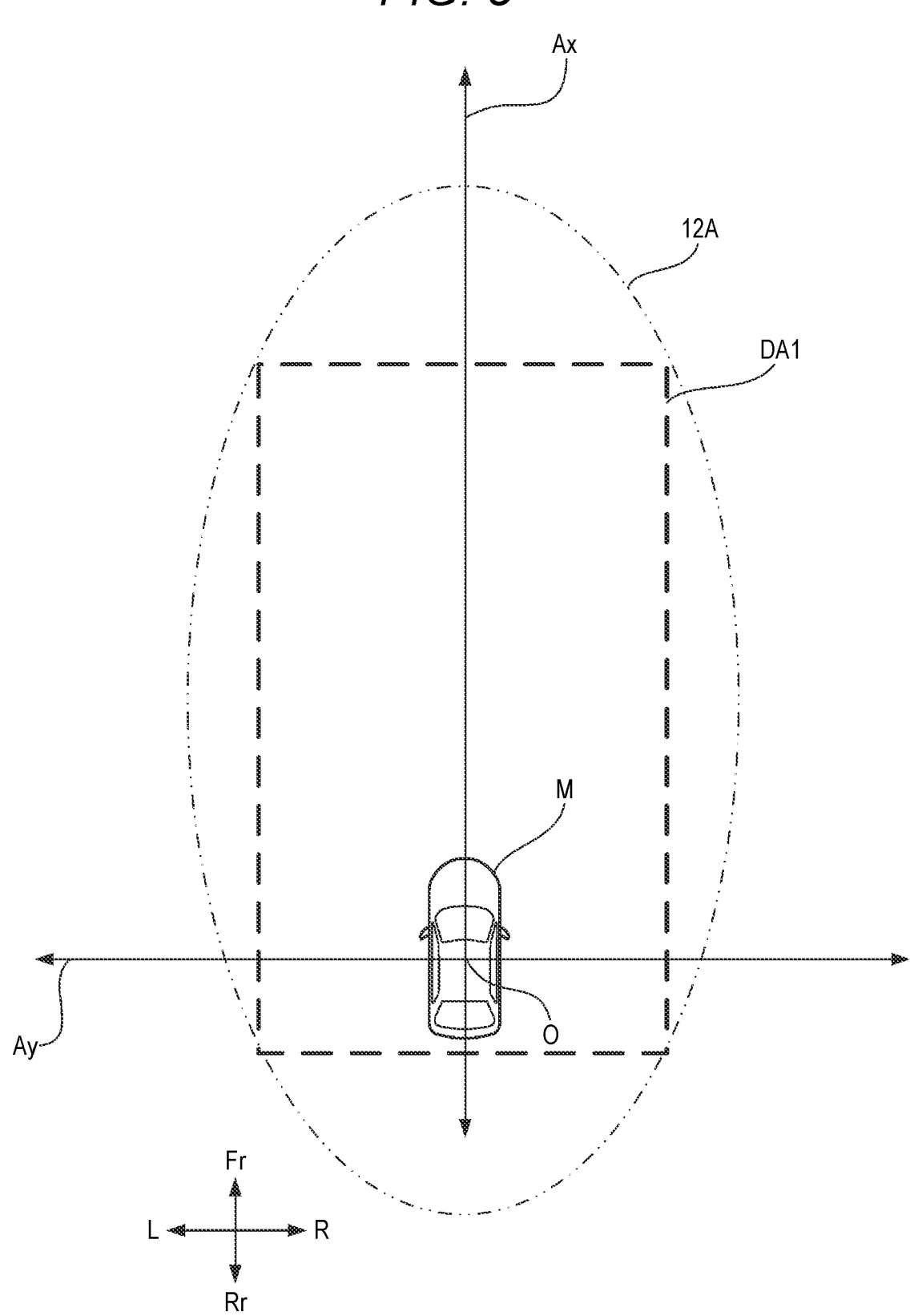
FIG. 5 is a view schematically illustrating a region in which an object can be detected by radar devices 12 in an around of the vehicle M.

FIG. 5 is a view schematically illustrating a region in which the object can be detected by the radar devices 12 in the around of the vehicle M. FIG. 5 illustrates a range 12A in which the object can be detected by the radar devices 12. In the present embodiment, for example, a peripheral region DA1 that is included in the range 12A and in which a detection resolution of the object detected by the radar devices 12 is sufficiently high is set. The recognition unit 130 acquires the detection point group data in the peripheral region DA1. That is, when an object is present in the peripheral region DA1, detection point data of the object is output from the radar devices 12, and detection point group data corresponding to the object is acquired by the recognition unit 130 from the detection point data. A position of the detection point group data is managed as coordinates on the XY plane indicated by the X axis Ax and the Y axis Ay illustrated in FIG. 5. An origin O illustrated in FIG. 5 indicates the representative point of the vehicle M.

<Recognition of Travel-Restricted Section>

Figure 6:
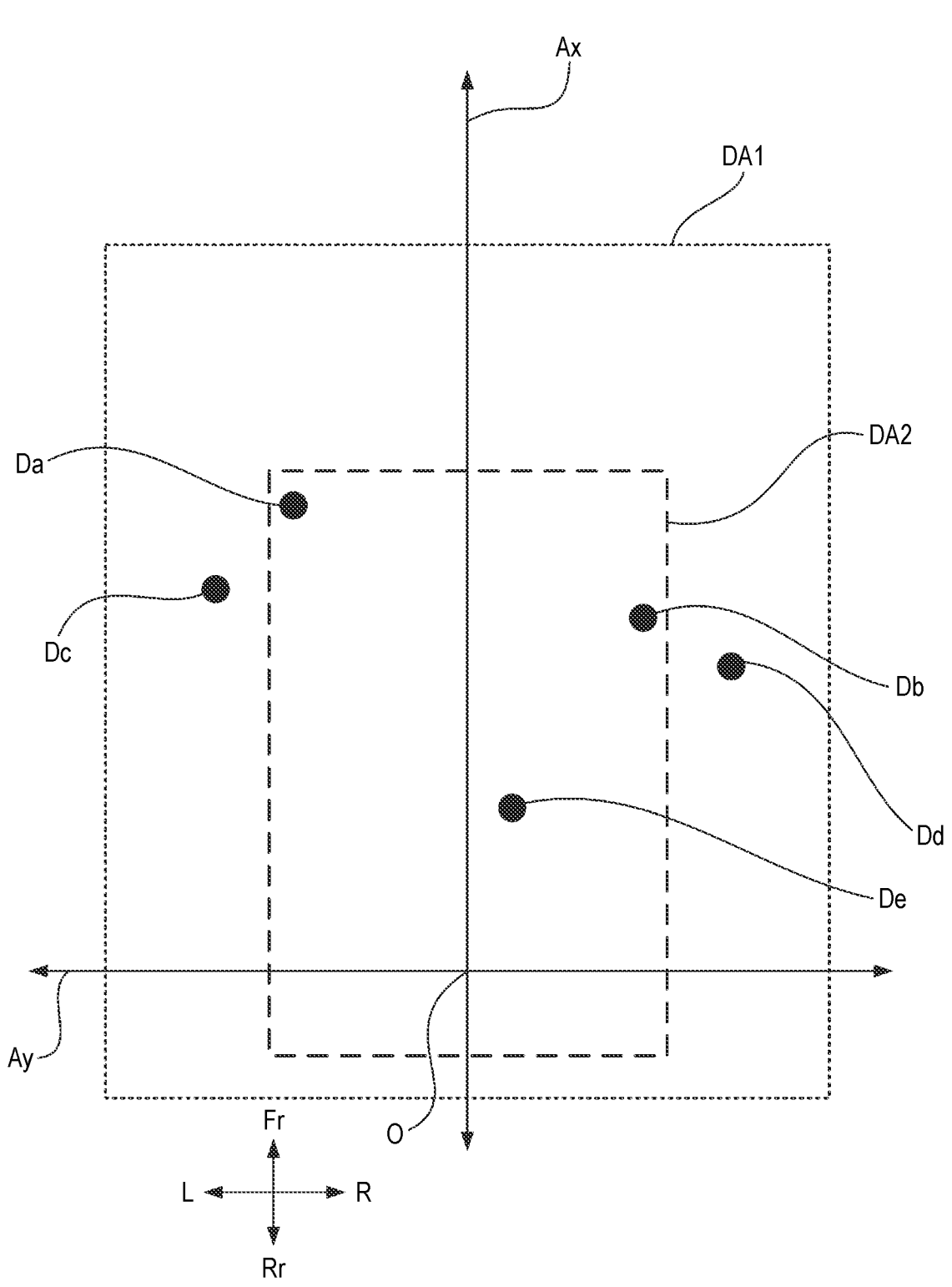
FIG. 6 is a schematic diagram illustrating an example of detection point group data acquired by a recognition unit 130.

FIG. 6 is a schematic diagram illustrating an example of the detection point group data acquired by the recognition unit 130. FIG. 6 illustrates an example in which five pieces of detection point group data including detection point group data Da, detection point group data Db, detection point group data Dc, detection point group data Dd, and detection point group data De are acquired as detection point group data of the object present in the peripheral region DA1.

When the recognition unit 130 acquires the detection point group data in the peripheral region DA1, the recognition unit 130 performs stationary object recognition of determining whether the object corresponding to the detection point group data is a first specific object (specifically, a stationary object that does not autonomously move) based on the detection point group data. Examples of the stationary object include a wall, a guardrail, and a pylon. When the recognition unit 130 recognizes the presence of the first specific object (stationary object) in the peripheral region DA1, the recognition unit 130 sets a peripheral region DA2 narrower than the peripheral region DA1 in the around of the vehicle M, and recognizes a second specific object present in the around of the vehicle M based on the detection point group data in the peripheral region DA2. Specifically, the second specific object is an object that can be discretely installed in the travel-restricted section, and is, for example, a pylon. That is, when the recognition unit 130 recognizes the presence of the first specific object (stationary object) based on the detection point group data in the peripheral region DA1, the recognition unit 130 reduces a use range of the detection point group data from the peripheral region DA1 to the peripheral region DA2.

As illustrated in FIG. 6, the peripheral region DA2 includes the origin O (the representative point of the vehicle M), and is a region whose width in the front-rear direction and width in the left-right direction is smaller than those of the peripheral region DA1. The recognition unit 130 performs specific object recognition of determining whether the object corresponding to the detection point group data is the second specific object based on the detection point group data in the peripheral region DA2 illustrated in FIG. 6.

Further, the recognition unit 130 also performs predetermined object recognition of determining whether the object corresponding to the detection point group data is a predetermined object based on the detection point group data in the peripheral region DA2. The predetermined object is an object continuously arranged in the front-rear direction, and is, for example, a guardrail or a wall. In the example of FIG. 6, when it is recognized that the first specific object (stationary object) is present in the peripheral region DA1 based on the detection point group data Da, Db, Dc, Dd, and De, the detection point group data De and Dd outside the peripheral region DA2 are not used to recognize the second specific object, and only the detection point group data Da, Db. and De in the peripheral region DA2 are used to recognize the second specific object.

When the recognition unit 130 recognizes the presence of the second specific object in the peripheral region DA2 through the specific object recognition, the recognition unit 130 recognizes that the peripheral environment of the vehicle M is the travel-restricted section.

When the recognition unit 130 recognizes the presence of the predetermined object in the peripheral region DA2 based on the detection point group data in the peripheral region DA2 after reducing the use range of the detection point group data from the peripheral region DA1 to the peripheral region DA2, the recognition unit 130 preferably recognizes the second specific object based on the detection point group data of a region of the peripheral region DA2 more inside (a side where the vehicle M is present) than the predetermined object in the left-right direction.

Figure 7:
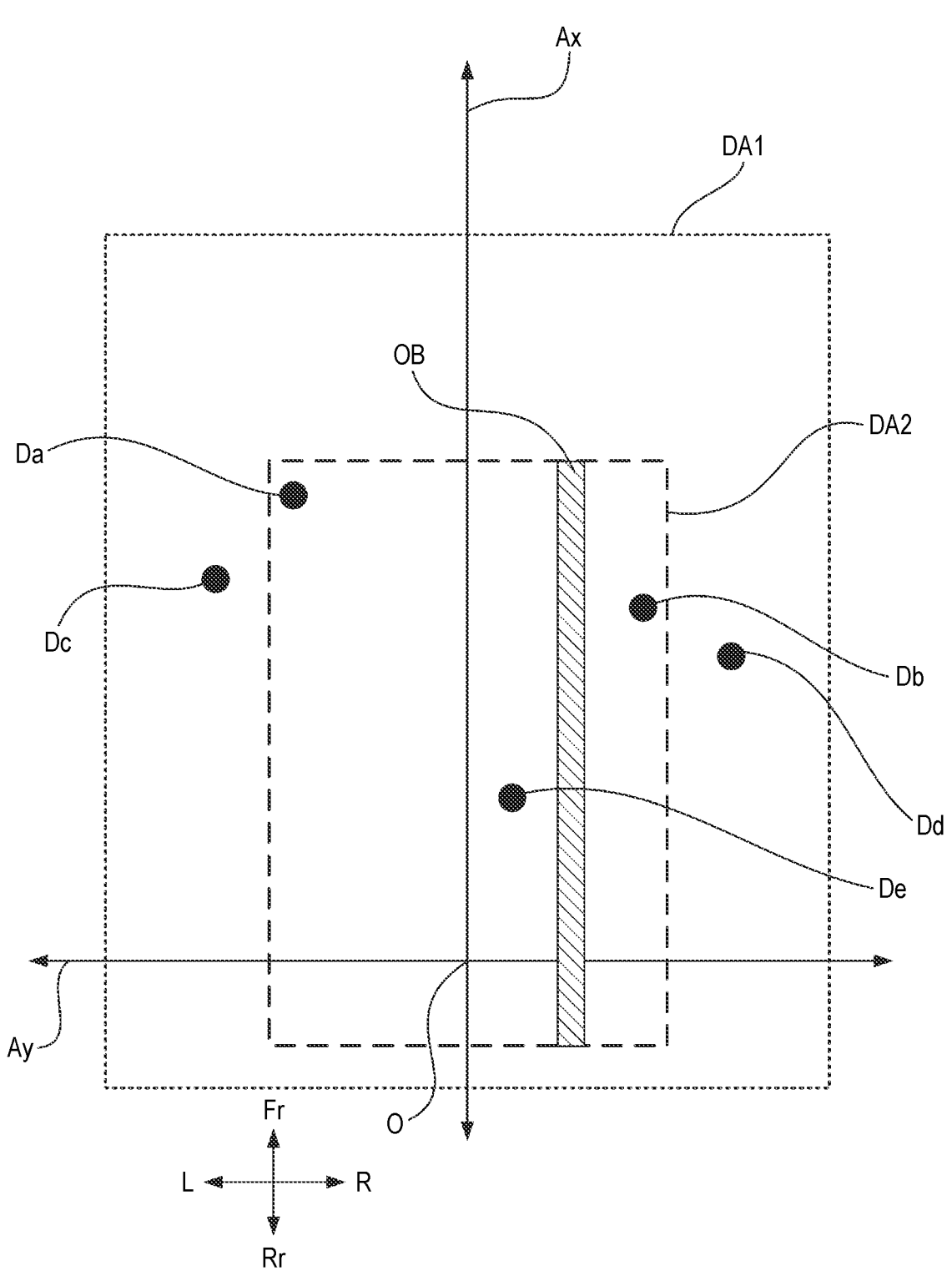
FIG. 7 illustrates an example in which presence of a predetermined object OB is recognized based on detection point group data in a peripheral region DA2.

FIG. 7 illustrates an example in which presence of a predetermined object OB is recognized based on the detection point group data in the peripheral region DA2. In the example of FIG. 7, the detection point group data Db in a region on a right side of the predetermined object OB in the peripheral region DA2 is not used for the recognition of the second specific object, and only the detection point group data Da and De in a region on a left side of the predetermined object OB in the peripheral region DA2 are used for the recognition of the second specific object.

Figure 8:
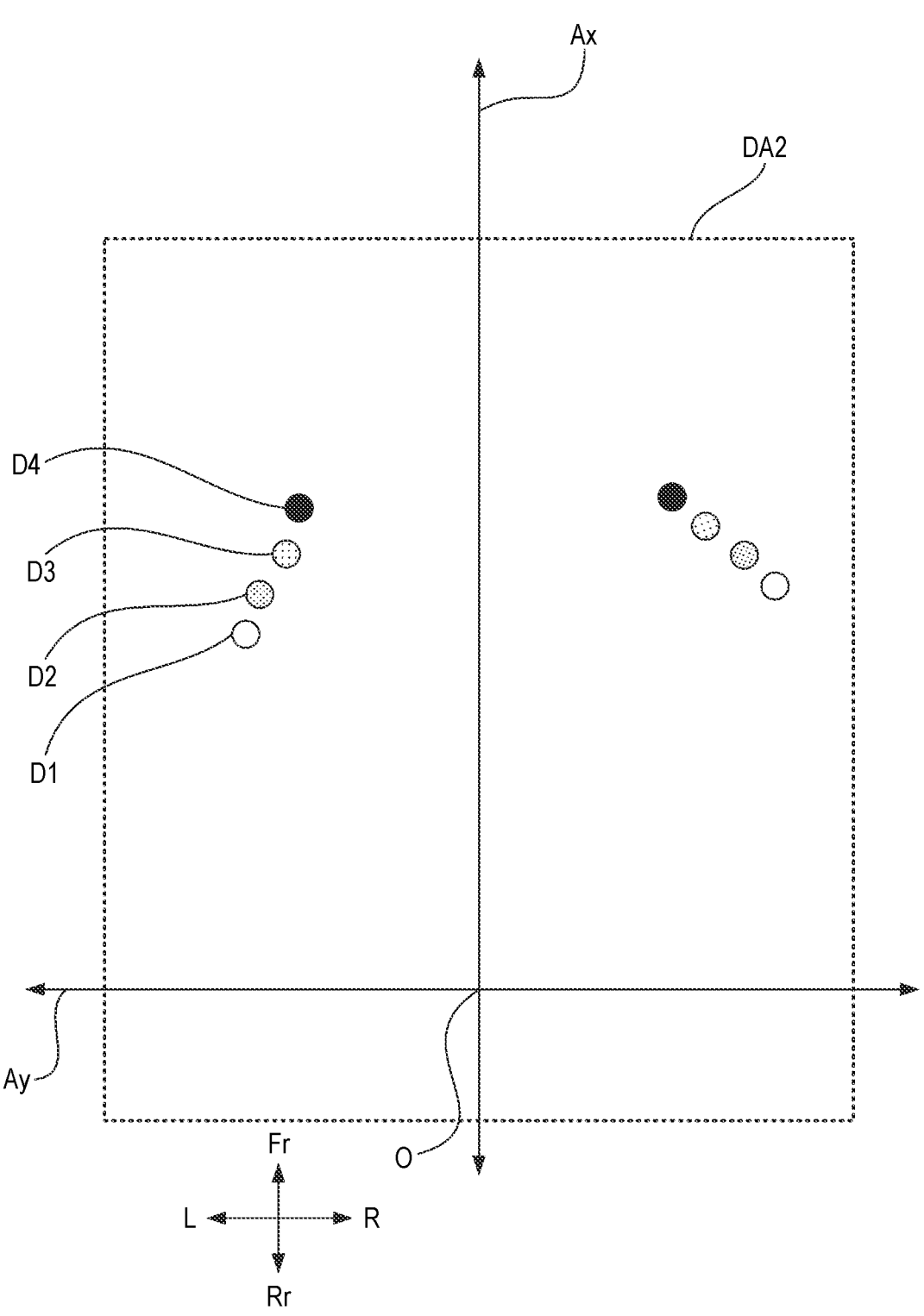
FIG. 8 is a schematic view illustrating detection point group data for a plurality of cycles.

It is preferable that the recognition unit 130 periodically acquires the detection point group data in synchronization with an output cycle of the radar device 12. FIG. 8 illustrates, as the detection point group data of the same object in the peripheral region DA2, latest detection point group data D4 acquired by the recognition unit 130, detection point group data D3 acquired in a cycle one cycle before the detection point group data D4, detection point group data D2 acquired in a cycle one cycle before the detection point group data D3, and detection point group data D1 acquired in a cycle one cycle before the detection point group data D2. The recognition unit 130 determines whether the object corresponding to a group of the detection point group data D1, D2, D3, and D4 is the second specific object based on the detection point group data D1, D2, D3, and D4 having different acquisition timings. In this way, recognition accuracy of the second specific object can be improved by recognizing the second specific object by integrating the latest detection point group data and the past detection point group data.

From a viewpoint of reducing a processing load and effectively using the memory, it is preferable to set an upper limit to the total number of the detection point data used to recognize the second specific object. That is, it is preferable to set an upper limit value to the total number of the detection point data included in the group of the detection point group data D1, D2, D3, and D4. When the upper limit value is set in this way, when the total number of the detection point data included in the group of the detection point group data D1, D2, D3, and D4 exceeds the upper limit value, the recognition unit 130 may delete the oldest detection point group data D1 among the detection point group data D1, D2. D3, and D4, and recognize the second specific object based on the remaining detection point group data D2, D3, and D4.

Hereinafter, an operation of the control device 100 will be described with reference to a flowchart. FIG. 9 is a flowchart illustrating the operation of the control device 100. Processing illustrated in FIG. 9 is performed, for example, during execution of any one of the first driving mode to the fourth driving mode illustrated in FIG. 4.

The recognition unit 130 acquires the detection point group data in the peripheral region DA1 based on the output information of the radar device 12 (step S1), and recognizes the presence of the stationary object (first specific object) in the peripheral region DA1 based on the acquired detection point group data (step S2). When it is recognized in step S2 that the stationary object is present in the peripheral region DA1 (YES in step S2), processing of step S3 is performed. When it is recognized in step S2 that there is no stationary object in the peripheral region DA1 (NO in step S2), the processing returns to step S1.

In step S3, the recognition unit 130 reduces the use range of the detection point group data to the peripheral region DA2. Thereafter, the recognition unit 130 recognizes the presence of the predetermined object in the peripheral region DA2 based on the detection point group data in the peripheral region DA2 (step S4). When the recognition unit 130 recognizes that there is no predetermined object in the peripheral region DA2 (NO in step S4), the recognition unit 130 recognizes the second specific object (pylon) in the peripheral region DA2 based on all the detection point group data in the peripheral region DA2 (step S10).

When the recognition unit 130 recognizes that the predetermined object is present in the peripheral region DA2 (YES in step S4), the recognition unit 130 excludes the detection point group data of a region more outside than the predetermined object in the left-right direction in the peripheral region DA2 from the detection point group data used for the recognition of the pylon (step S5).

After step S5, the recognition unit 130 determines whether there is a specific group in which the total number of the detection point data exceeds the upper limit value as a group of the plurality pieces of detection point group data acquired at different timings corresponding to the same object in the peripheral region DA2 (step S6). When the determination in step S6 is YES, the recognition unit 130 excludes oldest detection point group data among the plurality pieces of detection point group data included in the specific group from the detection point group data used for the recognition of the pylon (step S7). After step S7 or when the determination in step S6 is NO, processing of step S8 is performed. In step S8, the recognition unit 130 recognizes the pylon in the peripheral region DA2 based on the remaining detection point group data which is excluded from the detection point group data of the peripheral region DA2.

In either step S8 or step S10, when it is recognized that the pylon is present in the peripheral region DA2, the recognition unit 130 recognizes that the peripheral environment of the vehicle M is the travel-restricted section. When the recognition unit 130 recognizes that the travel environment is the travel-restricted section, the travel control unit 170 restricts the travel control of the vehicle M. Specifically, the travel control unit 170 restricts the lane change control. The restriction of the lane change control refers to prohibiting the lane change control or prohibiting a part of the lane change mode although the lane change control is executed. In this way, in a situation in which the vehicle M is traveling in the travel-restricted section or in a situation in which the vehicle M is approaching the travel-restricted section, it is possible to cause the vehicle M to travel safely by restricting the lane change control.

In both step S8 and step S10, when it is recognized that there is no pylon in the peripheral region DA2, the processing returns to step S2.

As described above, the presence of the stationary object in the around of the vehicle M means there is a high possibility that the peripheral environment of the vehicle M is the travel-restricted section, and thus, in step S3, by narrowing a recognizable range of the pylon, it is possible to prevent false recognition of the pylon and reduce a processing load. For example, in a situation in which the vehicle M is approaching the travel-restricted section, the recognition unit 130 also acquires the detection point group data of the object (an object distant from the vehicle M) in a range outside the peripheral region DA2. Since there is a high possibility that the detection point group data of such an object includes an error, it is possible to prevent the false recognition of the pylon and reduce the processing load by not using the detection point group data of such an object for the recognition of the pylon.

In the present specification, at least the following matters are described. Although corresponding components or the like in the above embodiment are shown in parentheses, the present disclosure is not limited thereto.

(1) A control device (control device 100) that performs travel control of a vehicle (vehicle M), the control device includes: a processor configured to acquire output information of a sensor (radar devices 12) configured to detect an object in an around of the vehicle based on a reflected wave from the object.

The processor is configured to acquire first detection point group data of the object in a first region (peripheral region DA1) in the around of the vehicle based on the output information of the sensor, and recognize a first specific object (stationary object) present in the around of the vehicle based on the first detection point group data, and recognize, when recognizing the presence of the first specific object, a second specific object (pylon) present in the around of the vehicle based on the first detection point group data in a second region (peripheral region DA2) that is narrower than the first region in the around of the vehicle.

According to (1), the presence of the first specific object such as a stationary object in the around of the vehicle means there is a high possibility that the peripheral environment of the vehicle is the travel-restricted section, and thus, by narrowing a recognizable range of the second specific object, false recognition of the second specific object can be prevented and a processing load can be reduced. By preventing false recognition and reducing the processing load, when a recognition result of the second specific object is used for the travel control, the travel control can be performed with high accuracy, and safety can be improved.

(2) The control device according to (1), in which a width of the second region in each of a left-right direction and a front-rear direction of the vehicle is smaller than that of the first region.

According to (2), since only the second specific object closer to the vehicle can be recognized, false detection of the second specific object can be prevented, and the processing load can be reduced.

(3) The control device according to (2), in which the processor is configured to recognize, when recognizing a predetermined object (wall or guardrail) present to extend in the front-rear direction of the vehicle based on the first detection point group data in the second region, the second specific object based on the first detection point group data in a region more inside than the predetermined object in the left-right direction of the vehicle in the second region.

According to (3), when the predetermined object such as a wall or a guardrail is present in the second region, the first detection point group data of the region more outside than the wall or the guardrail in the second region is not used to recognize the second specific object. Therefore, the recognition of the second specific object can be performed only in a necessary region, and the recognition of the second specific object can be performed at high speed and with high accuracy.

(4) The control device according to any one of (1) to (3), in which the processor is configured to periodically acquire the first detection point group data, and recognize the second specific object based on the first detection point group data for a plurality of cycles.

According to (4), it is possible to determine whether the object is the second specific object and determine the position of the object with high accuracy based on the first detection point group data of the object acquired continuously.

(5) The control device according to (4), in which the processor is configured to recognize, when the total number of detection point data included in the first detection point group data for the plurality of cycles detected from the same object exceeds a threshold, the first detection point group data for the plurality of cycles excluding the detection point group data having an old acquisition timing for the recognition of the second specific object.

According to (5), the processing load can be reduced.

(6) The control device according to any one of (1) to (5), in which the processor is configured to perform lane change control of the vehicle, and restrict the lane change control based on a recognition result of the second specific object.

According to (6), for example, when the presence of the second specific object is recognized, the lane change control is restricted, and thus, for example, the lane change is not performed in the travel-restricted section, and the safety can be improved.

(7) The control device according to any one of (1) to (6), in which the second specific object is a pylon.

The invention claimed is:

1. A control device that performs travel control of a vehicle, the control device comprising
   a processor configured to acquire output information of a sensor configured to detect an object in an area around the vehicle based on a reflected wave from the object, wherein
   the processor is configured to:
      acquire first detection point group data of the object in a first region in the area around the vehicle based on the output information of the sensor, and determine whether a predetermined first specific stationary object is present in the first region based on the first detection point group data;
      determine, in response to determining that the first specific stationary object is present in the first region, whether a second specific object is present in a second region based on only the first detection point group data in the second region and excluding the first detection point group data outside the second region that is predetermined to be narrower than the first region in the area around the vehicle;
      perform lane change control of the vehicle; and
      restrict the lane change control in response to determining that the second specific object is present in the second region, and
      the second specific object is a pylon.

2. The control device according to claim 1, wherein
a width of the second region in each of a left-right
  direction and a front-rear direction of the vehicle is
  smaller than that of the first region.

3. The control device according to claim 2, wherein
when the processor recognizes a predetermined object
  present to extend in the front-rear direction of the
  vehicle based on the first detection point group data in
  the second region, the processor is configured to rec-
  ognize the second specific object based on the first
  detection point group data in a region more inside than
  the predetermined object in the left-right direction of
  the vehicle in the second region.

4. The control device according to claim 1, wherein
the processor is configured to:
    periodically acquire the first detection point group data;
      and
    recognize the second specific object based on the first
      detection point group data for a plurality of cycles.

5. The control device according to claim 4, wherein
when a total number of detection point data included in
  the first detection point group data for the plurality of
  cycles detected from a same object exceeds a threshold,
  the processor is configured to use the first detection
  point group data for the plurality of cycles excluding
  detection point group data having an old acquisition
  timing for the recognition of the second specific object.

\* \* \* \* \*